United States Patent
Miyabayashi

[11] Patent Number: 5,364,697
[45] Date of Patent: Nov. 15, 1994

[54] SILICON COMPOSITION, ELASTIC REVOLUTION BODY AND FIXING DEVICE USING THE COMPOSITION

[75] Inventor: Toshiyuki Miyabayashi, Okaya, Japan

[73] Assignee: Canon Kabushiki Kaisha, Tokyo, Japan

[21] Appl. No.: 924,582

[22] Filed: Aug. 5, 1992

Related U.S. Application Data

[63] Continuation of Ser. No. 453,978, Dec. 20, 1989, abandoned.

[30] Foreign Application Priority Data

Dec. 23, 1988 [JP]  Japan .................. 63-326520

[51] Int. Cl.⁵ .......................... B05C 13/02; B32B 1/08; G03G 13/20; G03G 15/20
[52] U.S. Cl. ........................ 428/323; 118/60; 355/282; 355/285; 355/290; 355/295; 428/36.8; 428/36.9; 428/331; 428/339; 428/405; 428/447; 428/450; 430/99; 492/56; 492/59; 523/203; 523/212
[58] Field of Search ............... 29/132; 523/203, 212; 524/862; 428/447, 446, 331, 339, 36.8, 36.9, 323, 405, 450; 355/290, 295, 282, 285; 430/99; 118/60; 492/56, 59

[56] References Cited

U.S. PATENT DOCUMENTS

| | | | |
|---|---|---|---|
| 4,064,096 | 12/1977 | Gibard | 260/37 |
| 4,074,001 | 2/1978 | Imai et al. | 428/329 |
| 4,108,825 | 8/1978 | Hayes | 260/37 SB |
| 4,360,610 | 11/1982 | Murray et al. | 523/212 |
| 4,454,288 | 6/1984 | Lee et al. | 524/588 |
| 4,711,818 | 12/1987 | Henry | 428/421 |
| 4,777,087 | 10/1988 | Heeks et al. | 428/321.1 |
| 4,985,477 | 1/1991 | Collins et al. | 523/212 |

FOREIGN PATENT DOCUMENTS

| | | |
|---|---|---|
| 0062408 | 10/1982 | European Pat. Off. |
| 0206177 | 12/1986 | European Pat. Off. |
| 0280437 | 8/1988 | European Pat. Off. |
| 60-166975 | 8/1985 | Japan |
| 2192401 | 1/1988 | United Kingdom |

*Primary Examiner*—D. S. Nakarani
*Attorney, Agent, or Firm*—Fitzpatrick, Cella, Harper & Scinto

[57] ABSTRACT

A silicone composition is formed as a system including: a silicone compound, reactive group-containing modified silicic acid powder of which surface has been modified with an alkylsilane, a hexamethyldisilazane, a dimethylsilicone oil, or a mixture thereof, and an unsaturated group-containing silane compound; and inorganic fine powder carrying a surfactant. The silicone compound is preferably an addition reaction-type silicone rubber prepared from a dimethyl polysiloxane having a vinyl group, a methylhydrogenpolysiloxane and a platinum-based catalyst. The silicone composition is heat-cured to provide an elastic revolution body which is suitably used to constitute one or both of a fixing roller and a mating pressure roller in a roller fixing device for electrophotography.

31 Claims, 3 Drawing Sheets

SILICON COMPOSITION, ELASTIC REVOLUTION BODY AND FIXING DEVICE USING THE COMPOSITION

This application is a continuation of application Ser. No. 07/453,978 filed Dec. 20, 1989, now abandoned.

FIELD OF THE INVENTION AND RELATED ART

The present invention relates to an addition reaction-type silicone composition, an elastic revolution body having a surface layer comprising the silicone composition, and a fixing device equipped with the elastic revolution body. Particularly, the present invention relates to a composition suitable as a coating material of an elastic revolution body for use in a conveying roller for conveying transfer or recording sheets or a fixing roller for fixation in electrophotographic copying apparatus, printers or other image forming apparatus.

In an image forming apparatus such as electrophotographic copying machine, conveying ability, releasability and durability are generally required for the conveyer roller for conveying a sheet transfer material (or recording medium) such as plain paper along a prescribed conveying path. Further, conveying ability, releasability, abrasion resistance, fixing characteristics and durability are also required under severe conditions with respect to a fixing device comprising a fixing roller and a pressure roller, which applies heat to an unfixed toner image formed on a transfer paper under pressure and must convey the transfer paper to the prescribed conveying path while preventing an offset phenomenon due to sintered or melted toner.

Conventionally, the fixing device of this type comprises at least a fixing roller and a mating pressure roller or pressing roller which contacts the fixing roller under pressure and rotates mating with the fixing roller. The fixing roller comprises a hollow core bar (or cylinder) formed of a metal such as aluminum and iron, and a layer of a material having good releasability such as silicone rubber and fluorine-containing resin including polytetrafluoroethylene (PTFE), tetrafluoroethylene-fluoroalkoxyethylene copolymer (PFA), etc., which covers the core bar. Inside the fixing roller, a heater such as a halogen lamp is disposed as desired, thereby to elevate the surface temperature of the fixing roller to a temperature suitable for the fixing. In many cases, the above-mentioned surface temperature of the fixing roller is controlled by means of a sensor so that it is set to a prescribed temperature. Further, around the peripheral surface of the fixing roller, there is sometimes disposed a cleaner for removing the offset toner and paper dust, or a separation claw for preventing an image-supporting material such as transfer paper from winding about the fixing roller.

On the other hand, the pressure roller comprises a core bar formed of a metal such as iron and stainless steel, and an elastic layer having releasability and comprising a material such as silicone rubber, which covers the core bar. The pressure roller is caused to contact the fixing roller under pressure by a pressure-applying means such as a spring.

The image-supporting material carrying thereon an unfixed toner image is sandwiched between and conveyed by the above-mentioned fixing roller and pressure roller under pressure, whereby the unfixed toner image is fixed to the image-supporting material under heating and pressure. However, in the conventional fixing device, the pressure roller is charged to have a high voltage (e.g., 2 KV or higher) because of triboelectrification when the paper is passed through the device, whereby a problem such as paper winding about the pressure roller is liable to occur. Further, there is posed a problem that unfixed toner particles are scattered by the electric field due to the pressure roller to blur line images, or that the toner is attached to the fixing roller surface to often cause the offset phenomenon.

In the prior art, in order to solve the above-mentioned problems, a discharge brush is caused to contact the pressure roller thereby to discharge it by grounding. However, the potential of the pressure roller is only decreased to about 1-2 KV, whereby the discharge effect is limited and is insufficient.

In the case of a fixing device without cleaning means for cleaning the fixing roller surface, the amount of toner particles attached to the fixing roller surface is increased when the surface is considerably charged, whereby there is liable to occur a problem of image failure such as the offset, or of staining of the roller surface with toner particles attached thereto.

In a fixing device using a roller under heating and pressure, it has been found that when there is used a pressure roller having a surface layer comprising a silicone rubber composition obtained by adding a surfactant such as fluorine-containing surfactant to a silicone rubber, the charging of the pressure roller is suppressed and therefore the amount of the toner attached to the fixing roller surface is remarkably reduced. Further, there is also observed an improvement in respects of image failure such as the offset and staining of the pressure roller with toner particles attached thereto.

However, it has been found that when a silicone rubber of addition reaction-type is used as the silicone rubber for a roller, the addition of a surfactant adversely affects the curing (or hardening) reaction of the addition reaction-type silicone rubber.

The addition reaction-type silicone rubber is generally prepared from a "liquid A" comprising at least a base polymer of liquid vinyl group-containing diorganopolysiloxane and a platinum-based catalyst as a catalyst for curing reaction; and a "liquid B" comprising at least an active hydrogen-containing siloxane as a crosslinking or curing agent and a liquid vinyl group-containing diorganopolysiloxane. In the preparation, the above-mentioned liquid A and liquid B are mixed at a prescribed ratio (e.g., a ratio of 1:1), and the resultant mixture is defoamed or degassed and then heated to be cured. The thus obtained addition reaction-type silicone rubber is solid and has elasticity because of its crosslinked structure.

When various amounts of the fluorine-containing surfactant were added to the above-mentioned liquid A or liquid B, respectively, the curing is inhibited in an amount of 0.4 wt. % or more, and particularly, the curing failure was remarkable in an amount of 1 wt. % or more. Even in the addition amount wherein the curing failure is a little, there was observed a decrease in the physical property such as hardness, strength, resilience, and compression permanent deformation, with respect to the resultant addition reaction-type silicone rubber. Further, when the liquids A and B to which the fluorine-containing surfactant had been added were left standing still for a long period, the liquid silicone rubber and the fluorine-containing surfactant were separated from each other, whereby there was posed a problem in the storage stability or shelf life thereof.

Further, the strength or durability of the silicone rubber still leaves a room for improvement. In order to reinforce silicone rubber, it has been generally performed to add synthetic silicic acid (so-called "white carbon") such as hydrous silicic acid or anhydrous silicic acid. Hydrous synthetic silicic acid does not show a reinforcing effect unless it is added in a considerably large amount of 20-50 wt. parts per 100 wt. parts of the silicone rubber, and such addition in a large amount results in a remarkable decrease in releasability. Anhydrous synthetic silicic acid can develop a reinforcing effect in a relatively small amount of, e.g., 10-20 wt. parts compared with hydrous silicic acid but still results in a remarkable decrease in releasability.

Accordingly, it has been impossible to remarkably increase the strength of silicone rubber without lowering the fixation characteristic or releasability in any case.

SUMMARY OF THE INVENTION

As a result of intensive study, it has been found possible to solve the above-mentioned problems by adding a reactive group-containing modified synthetic silicic acid formed by modifying the surface of a synthetic silicic acid, such as anhydrous or hydrous silicic acid, with an alkylsilane, hexamethyldisilazane, a dimethylsilicone oil or a mixture thereof, and an unsaturated group-containing silane compound, and also inorganic fine powder carrying a surfactant such as a fluorine-containing surfactant, to a liquid addition reaction-type silicone compound, such as dimethylsilicone rubber.

Accordingly, an object of the present invention is to provide an addition reaction-type silicone (rubber) composition, such as a dimethylsilicone (rubber) composition, which is excellent in mechanical strength and also has a high impact resilience and a low surface energy.

Another object of the present invention is to provide an addition reaction-type silicone (rubber) composition which has an excellent antistatic effect.

Another object of the present invention is to provide an addition reaction-type silicone (rubber) composition having an excellent discharging (or charge-removing) effect.

A further object of the present invention is to provide an elastic revolution body which is excellent in mechanical strength and has a high impact resilience.

Another object of the present invention is to provide an elastic revolution body excellent in discharging effect.

Another object of the present invention is to provide an elastic revolution body having a surface which is not readily contaminated or stained.

Another object of the present invention is to provide an elastic revolution body which is excellent in durability.

A still further object of the present invention is to provide a fixing device excellent in anti-offset characteristic.

Another object of the present invention is to provide a fixing device which is excellent in durability.

According to a first aspect of the present invention, there is provided a silicone composition, comprising:
a silicone compound,
reactive group-containing modified silicic acid powder of which surface has been modified with an alkylsilane, a hexamethyldisilazane, a dimethylsilicone oil, or a mixture thereof, and an unsaturated group-containing silane compound, and
inorganic fine powder carrying a surfactant.

According to the present invention, there is further provided an elastic revolution body, comprising: an elastic body comprising at least a surface layer thereof a cured product of the above silicone composition.

According to a further aspect of the present invention, there is provided a fixing device, comprising a pair of rollers for passing therebetween a toner-supporting material carrying an unfixed toner image to fix the toner image onto the toner image-supporting material; wherein at least one of the pair of rollers comprises an elastic surface layer comprising a cured product of the above silicone composition.

These and other objects, features and advantages of the present invention will become more apparent upon a consideration of the following description of the preferred embodiments of the present invention taken in conjunction with the accompanying drawings.

DETAILED DESCRIPTION OF THE INVENTION

As described above, the silicone composition according to the present invention, comprises: (a) a silicone compound, (b) a surface-modified synthetic silicic acid, and (c) inorganic fine powder carrying a surfactant. The silicone compound may preferably be silicone rubber (before curing), particularly an addition reaction-type dimethylsilicone rubber.

The silicone composition according to the present invention will now be described in further detail with particular reference to an addition reaction-type dimethylsilicone rubber composition as a preferred embodiment wherein the silicone compound is addition reaction-type dimethylsilicone rubber.

The dimethylsilicone rubber composition according to the present invention is a curable or hardeneable composition comprising a uniform mixture including, as essential components, the following components (I)-(V):

Component (I): a vinyl group-containing dimethylpolysiloxane comprising at least one of:
a dimethylpolysiloxane having a terminal vinyl group represented by the formula:

wherein l is a positive integer, preferably in the range of 50-2000; and
a dimethylpolysiloxane containing a vinyl group in its side chain represented by the formula:

wherein m and n respectively denote a positive integer and k denotes 0 or a positive integer, preferably satisfying that m+k=50-2000, and n is an integer in the range of 1-10.

Incidentally, in the present invention, the above Component (I) may for example be replaced by an organopolysiloxane containing an unsaturated (preferably, vinyl) group inclusive of those obtained by replacing one or more methyl groups in the above formulae with an alkyl or partially or completely halo-substituted alkyl (preferably, fluoro- substituted alkyl group) having, e.g., 1-3 carbon atoms.

Component (II): a methylhydrogenpolysiloxane represented by the formula:

wherein p and q respectively denote a positive integer and r denotes 0 or a positive integer, preferably satisfying that p+r=50-500 and r is an integer in the range of 1-10.

Likewise, the above Component (II) may for example be replaced by an organopolysiloxane containing an active hydrogen (Si-bonded hydrogen) inclusive of those obtained by replacing one or more methyl groups in the above formula with an alkyl or partially or completely halo-substituted alkyl (preferably, fluoro-substituted alkyl group) having, e.g., 1-3 carbon atoms.

Component (III): a platinum-based catalyst such as platinum or a platinum compound. The catalyst may be added in a concentration of, e.g., 100-5000 ppm.

Component (IV): a reactive group-containing surface-modified synthetic silicic acid obtained by surface-treating a synthetic silicic acid such as anhydrous silicic acid or hydrous silicic acid with at least one of an alkylsilane compound, hexamethyldisilazane and a dimethylsilicone oil, and also with an unsaturated group-containing silane.

Component (V): fine powder carrying a surfactant, such as a fluorine-containing surfactant.

The components (I), (II) and (III) in the above composition constitutes a liquid addition reaction-type dimethylsilicone rubber (composition). The vinyl group in the component (I) and the hydrogen bonded to Si in the component (II) initiate an addition reaction under heating (e.g., 100°-180° C for 0.5-20 min.) in the presence of the platinum-based catalyst to provide a silicone rubber.

The component (IV) in the above composition is provided with an unsaturated group through the surface-treatment, which group reacts the hydrogen bonded to Si in the component (II), so that the mechanical strength of the resultant silicone rubber product can be increased while suppressing a decrease in impact resilience. Particularly, this effect is exhibited by adding even a small amount of the component (IV), so that the increase in surface energy caused by addition of a large amount of filler can be prevented or suppressed. It is preferred that the component (IV) is added in a proportion of 0.5-20 wt. parts, preferably 1-15 wt. parts, per 100 wt. parts of the silicone rubber (the total of the components (I)-(III)).

Examples of the synthetic silicic acid may include ultrafine-fine powder so-called "white carbon", such as anhydrous silicic acid ($SiO_2$ $nH_2O$; $SiO_2$ content=95% or higher), hydrous silicic acid ($SiO_2$ $nH_2O$; $SiO_2$ content=80-95%), hydrous calcium silicate ($xSiO_2 \cdot CaO \cdot yH_2O$, $SiO_2$ content=55-70%), and hydrous aluminum silicate ($xSiO_2 \cdot Al_2O_3 \cdot yH_2O$; $SiO_2$ content=60-70%). The synthetic silicic acid may preferably be in the form of fine powder having a primary particle size of 7-100 μm (milli-micron), and a BET specific surface area of 40-500 $m^2/g$.

Specific examples of the surface-treating agent may include: alkylsilanes such as trimethylmethoxysilane, trimethylethoxysilane, dimethyldimethoxysilane, dimethyldiethoxysilane, methyltrimethoxysilane, methyltriethoxysilane, trimethylchlorosilane, dimethyldichlorosilane, and methyltrichlorosilane; hexamethyldisilazane; and dimethylsilicone oil. Further, specific examples of the reactive unsaturated group-containing silane may include: vinylsilanes such as vinyltriethoxysilane, dimethylvinylmethoxysilane, dimethylvinylethoxysilane, methylvinyldimethoxysilane, methylvinyldiethoxysilane, vinyltrichlorosilane, dimethylvinylchlorosilane, and methylvinyldichlorosilane; and silane compounds having a methacryloxypropyl group such as γ-metharyloxypropyltrimethoxysilane, and γ-methacryloxypropylmethyldimethoxysilane. The surface of the silicic acid fine powder may be treated with the above-mentioned treating agent in a known treating process.

In order to enhance the releasability and the wettability with the components (I) and (II), a treating agent comprising alkylsilane, or dimethylsilicone oil or a mixture thereof may preferably be used in such an amount as to cover 30-90% of the specific surface of the silicic acid fine powder. In other words, when the amount of total silanol groups present at the surface of the silicic acid fine powder is represented by 100%, 30-90% of the silanol groups may preferably react with the above treating agent. In view of the reinforcement of the silicone rubber composition, 10–50% of the specific surface area, (i.e., 10–50% of the silanol groups at the surface of the silicic acid fine powder may preferably be covered with the unsaturated group-containing silane. More specifically, it is preferred that 100 wt. parts of the synthetic silicic acid may preferably be treated with 0.5–100 wt. parts of the above-treating agents.

In the component (V) constituting the silicone composition according to the present invention, i.e., inorganic fine powder carrying a surfactant, such as a fluorine-containing surfactant, the surfactant is carried in microscopic pores in the inorganic fine powder, so that poor or insufficient hardening of the addition reaction-type silicone rubber composition as may be caused in case of direct addition of the surfactant can be suppressed or prevented, and the surfactant can be added in a larger amount. Further, as the surfactant carried in the micropores is liberated gradually, a shaped product obtained from the composition of the present invention may retain good charge-suppressing effect and discharging effect for a long period of time. A surfactant is characterized by having both a polar group and a nonpolar group and thus having both properties of hydrophilicity and hydrophobicity. The surfactant used in the present invention is required to show a surface free energy-decreasing effect, a charge-suppressing effect and a discharging effect on the shaped silicone rubber product and also a heat resistance for a fixing roller used at a surface temperature in the range of 100° C. to 200° C. For this reason, the surfactant may preferably be a fluorine-containing surfactant or a silicone-type surfactant.

Examples of the fluorine-containing surfactant may include: fluorinated alkyl esters, perfluoroalkylpolyoxyethylene ethanol, perfluoroalkylcarboxylic acid salts, perfluoroalkylammonium salts, perfluoroalkylbetaine, perfluoroalkylamine oxide, perfluoroalkylethylene oxide adducts, perfluoroalkylphosphates, and non-dissociative perfluoroalkyl compounds. Particularly, perfluoro-ethylene oxide adducts are preferred because of little hardening inhibition and excellent discharging effect.

Examples of the silicone-type silicone surfactant may include: polyether-modified silicone oil, epoxypolyether-modified silicone oil, alkylaralkylpolyether-modified silicone oil, and amino-modified silicone oil. Particularly, polyether-modified silicone oil is preferred.

The inorganic fine powder carrying such a surfactant may preferably be porous fine powder having minute pores which can be readily impregnated with a large amount of surfactant. The inorganic fine powder is preferred because of excellent thermal stability, and examples thereof may include gyrolite-type calcium silicate (e.g., "Florite" (trade name) mfd. by Tokuyama Soda K.K.), spherical porous silica (e.g., "M. S. GEL" (trade name) mfd. by Dohkai Kagaku Kogyo K.K.) and Sirasu-balloon (spherical powder obtained from volcanic ash). The inorganic fine powder may preferably have an average particle size of 5–70 microns, most preferably an average particle size of 10–40 microns, and a pore diameter of 0.01–30 microns, particularly 0.01–10 microns. Further, the inorganic fine powder may suitably have an oil absorption (capability) (JIS K5105-1978)of 200–800 ml/100 g, preferably 300–600 ml/100 g, before carrying the surfactant.

It is preferred that 100 wt. parts of the fine powder is impregnated with 100–600 wt. parts, particularly 400–500 wt. parts of the surfactant, such as a fluorine-containing surfactant. The inorganic fine powder having micro-pores impregnated with a surfactant is preferably added to the silicone rubber composition so as to effectively add the surfactant in a proportion of 0.1–10 wt. %, particularly 0.5–5 wt. %, of the silicone rubber.

The silicone composition according to the present invention comprising the components (I)–(V) provides a cured product (shaped product) having maximum mechanical strength, hardness and impact resilience and best releasability when the molar ratio of the unsaturated group and the hydrogen bonded to Si in the composition is in the range of 0.5–1.8, preferably 0.8–1.2, particularly preferably about 1.0 (0.95–1.05). Accordingly, the components (I), (II) and (IV) may be mixed so that the total amount of the unsaturated groups in the components (I) and (IV) and the amount of Si-bonded hydrogen in the component (II) are approximately the same on a molar basis.

Into the addition reaction-type silicone rubber composition according to the present invention, additives, such as a colorant, a heat resistance improver, and a permanent set stress improver, may be added as desired within an extent not impairing the object of the invention.

The silicone composition according to the present invention can be prepared by simply mixing the above-described components together, but it is convenient to separately prepare a liquid-A comprising the components (I), (III), (IV) and (V) and a liquid-B comprising the components (II), (IV) and (V), or a liquid-A comprising the components (I), (III), (IV) and (V) and a liquid-B comprising the components (I), (II), (IV) and (V) in advance and then mix the liquid-A and the liquid-B in a prescribed ratio at the time of converting the composition into a cured product. In this instance, a single package must not contain all of the unsaturated group-containing component, the group-containing component and the platinum-based catalyst component.

Hereinbelow, an embodiment of the elastic revolution body and the fixing device according to the present invention is described with reference to the accompanying drawings.

Figure 2:
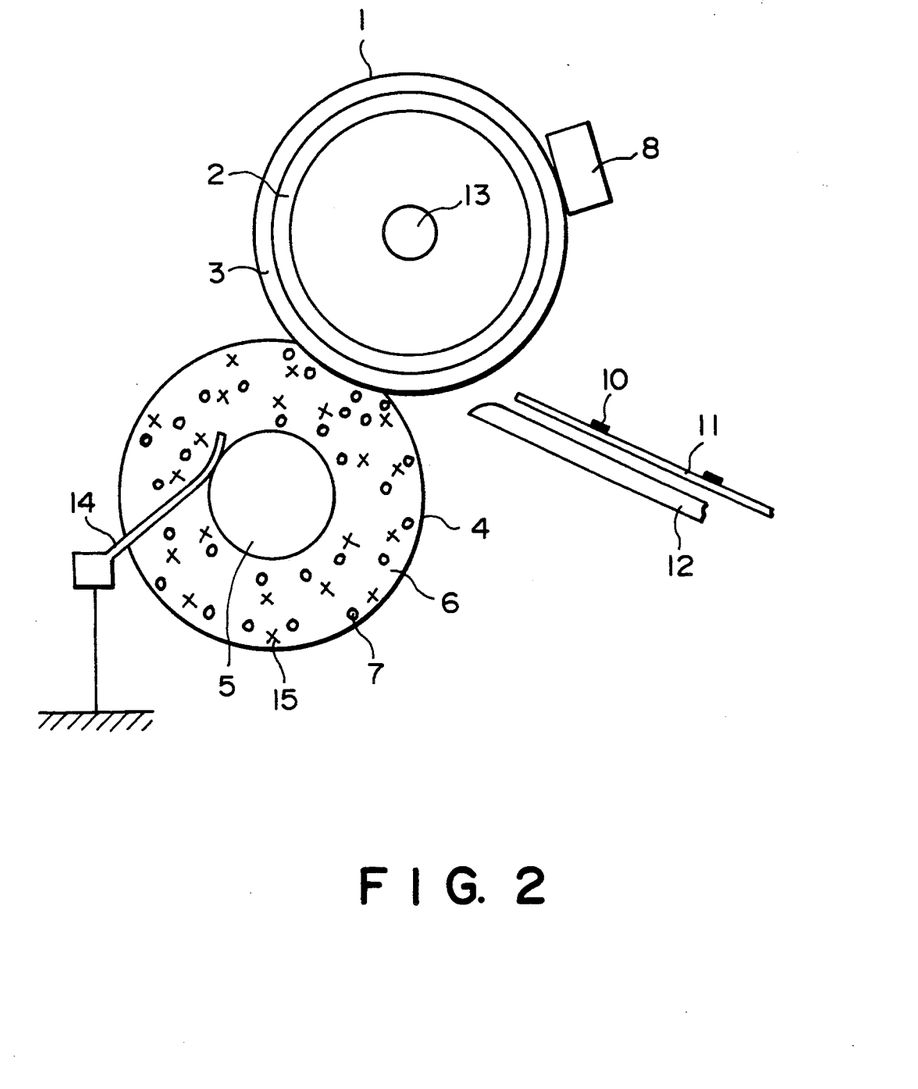
FIG. 2 is a schematic sectional view of an embodiment of the fixing device according to the present invention.

FIG. 2 is a longitudinal schematic sectional view showing an arrangement of the fixing device which has the elastic revolution body according to the present invention as a pressure roller.

Referring to FIG. 2, the fixing device comprises a fixing roller 1 comprising a core bar 2 formed of a metal such as aluminum, iron and stainless steel; and a resin layer 3 formed on the outer surface of the core bar 2 comprising a resin having heat-resistance and releasability of, e.g., a fluorine-containing resin such as tetrafluoroethylene-perfluoroalkyl vinyl ether copolymer (PFA) or polytetrafluoroethylene PTFE. Inside the core bar 2, a heating means 13 such as a heater is disposed.

Opposite the fixing roller 1, a pressure roller 4 is disposed to contact it under pressure by means of a pressing means (not shown) such as a spring so that it rotates corresponding to the rotation of the fixing roller 1. The pressure roller 4 comprises a core bar 5 formed of a metal such as iron and stainless steel, and an elastic layer 6 formed thereon which is formed from the silicone composition (e.g., silicone rubber composition) according to the present invention. The elastic layer 6 contains an inorganic fine powder carrying a surfactant 7 and surface-modified synthetic silicic acid 15.

Around the fixing roller 1, there may be disposed, as desired, a thermistor 8 for detecting the temperature of the fixing roller 1, or a cleaner (not shown) contacting the fixing roller 1 to clean the surface thereof. In FIG. 1, there is disposed an inlet guide 12 for introducing a toner-supporting material (or transfer material) 11 such as plain paper having thereon a toner image 10, between the fixing roller 1 and the pressure roller 4. On the other hand, a conductive flat spring 14 for grounding the core bar 5 of the pressure roller 4.

The addition reaction-type silicone rubber composition according to the present invention provides a cured product which is excellent in both mechanical strength and releasability. Accordingly, if the cured product is used as a coating material for a heat-fixing roller for electrophotography, the coating material shows an improved durability to provide a remarkably increased size stability, so that no paper wrinkle is caused but the releasability is improved, thus completely removing the toner attachment onto the roller surface. Further, the cured product shows an anti-static effect and a discharging effect, so that the charging of the roller can be prevented or decreased, the toner off-set can be remarkably decreased, and the paper curl and jamming can be prevented or suppressed during the operation.

The fixing device having a fixing roller coated with the cured silicone rubber composition according to the invention can solve the problem such as paper curl, paper wrinkle, paper jamming, toner offset and contamination with toner during paper transfer and fixing thereon, thus showing sufficient durability as well as excellent releasability and fixing performance.

The cured silicone rubber composition according to the present invention can be used as a coating material for both of the fixing roller and mating pressure roller, or alternatively can be used as a coating material for either one of the fixing roller and pressure roller in a fixing roller system.

Hereinbelow, the present invention will be described in more detail with reference to Examples.

EXAMPLES 1

The following components (I)–(VI) were provided.

Component (I): Vinyl group-containing dimethylpolysiloxane comprising dimethylpolysiloxane having terminal vinyl groups and dimethylpolysiloxane having terminal methyl groups and vinyl groups in side chains, containing total vinyl groups at a rate of $5.2 \times 10^{-5}$ mol/g and a viscosity of 7000 cst.    100 wt. parts Component (II): Methylhydrogenpolysiloxane containing Si-bonded hydrogen atoms at a rate of $1.6 \times 10^{-3}$ mol/g and having a viscosity of 100 cst.    7.2 wt. parts Component (III): Platinum catalyst    0.09 wt. parts

Component (IV): Reactive group-containing hydrous synthetic silicic acid with a surface treated with dimethylsilicone oil and vinyl group-containing silane    10 wt. parts Component (V): Porous inorganic fine powder impregnated with a fluorine-containing surfacant    10 wt. parts Component (VI): Red iron oxide    1 wt. part The component (IV) was prepared as follows. One hundred wt. parts of hydrous synthetic silicic acid surface-treated with dimethylsilicone oil and having an average particle size of 8.6 microns and a specific surface area of 114 m²/g (hydrophobic silica "NIPSIL ® SS30P", mfd. by Nihon Silica K.K.) was introduced into a stirring apparatus and 12 wt. parts of vinyltriethoxysilane was added dropwise thereto under forcible stirring. The mixture was taken out from the stirring apparatus, followed by 1 hour of drying with air at 100° C. to obtain the objective vinyl group-containing surface-modified synthetic silicic acid. The product in powdery form containing $3.8 \times 10^{20}$ vinyl groups/g.

The component (V) was prepared as follows. One hundred wt. parts of gyrolite-type calcium silicate (Fluorite ® R, mfd. by Tokuyama Soda K.K.) having an average particle size of 25 microns, a pore diameter of about 0.01–10 microns, an oil absorption of 500 ml/100 g, an apparent specific gravity of 0.1 and a BET specific surface area of 115 m²/g was introduced into a stirring apparatus, and 400 wt. parts of an acetone solution containing 70 wt. % of a fluorine-containing surfactant comprising perfluoroalkyl-ethylene oxide adduct (N-polyoxyethylene-N-alkyl-perfluorooctanesulfonamide (R: alkyl, n: about 20)) was gradually added dropwise to the calcium silicate under stirring, and the product was taken out from the stirring apparatus and dried with air for 1 hour at 50° C. to prepare calcium silicate fine powder impregnated with surfactant.

The components (I)–(VI) constituting a composition according to the present invention were adjusted in amount to provide equal molar amounts of the vinyl groups and the active hydrogen (Si-bonded hydrogen) in the composition.

The components were formulated into two liquids as follows.

| Liquid A | |
|---|---|
| Component (I) | 43.73 g |
| Component (III) | 0.07 g |
| Component (IV) | 4.08 g |
| Component (V) | 1.72 g |
| Component (VI) | 0.4 g |
| Liquid B | |
| Component (I) | 37.92 g |
| Component (II) | 5.88 g |
| Component (IV) | 4.08 g |
| Component (V) | 1.72 g |
| Component (VI) | 0.4 g |

The above liquids-A and -B were respectively prepared by uniform mixing. The liquid-A and the liquid-B thus prepared were mixed with each other in a weight ratio of 100:100, and after defoaming, the mixture was then hot-pressed at 150° C. for 10 min. to obtain an elastomeric body, which was then post-cured for 4 hours at 200° C.

EXAMPLE 2

A composition according to the present invention was prepared from the components (I), (II), (III), (V) and (VI) in Example 1 together with the following component (IV).

Component (IV): Reactive group-containing hydrous synthetic silicic acid surface-treated with methylmethoxysilane and vinyl group-containing silane
10 wt. parts The component (IV) was prepared as follows. One hundred wt. parts of hydrous silicic acid ("NIPSIL® N 300A", mfd by Nihon Silica K.K.) having an average particle size of 2 microns and a specific surface area of 170 m$^2$/g was introduced into a stirring apparatus, and under forcible stirring, 3 wt. parts of methyltriethoxysilane was added dropwise and then 12 wt. parts of vinyltriethoxysilane was similarly added dropwise thereto. After the dropwise addition, the treated powder was taken out from the stirring apparatus and dried with air at 100° C. for 1 hour to obtain the objective vinyl group-containing surface-modified hydrous silicic acid in powder form. The powder contained $3.8 \times 10^{20}$ vinyl groups/g.

The components (I)–(VI) were adjusted in amount to provide nearly equal moles of the vinyl group and the active hydrogen in the composition, and formulated to provide two liquids as follows.

| Liquid A | |
|---|---|
| Component (I) | 43.73 g |
| Component (III) | 0.07 g |
| Component (IV) | 4.08 g |
| Component (V) | 1.72 g |
| Component (VI) | 0.4 g |
| Liquid B | |
| Component (I) | 37.92 g |
| Component (II) | 5.88 g |
| Component (IV) | 4.08 g |
| Component (V) | 1.72 g |
| Component (VI) | 0.4 g |

The above liquids-A and -B were respectively prepared by uniform mixing. The-liquid-A and liquid-B thus prepared were mixed with each other in a weight ratio of 100:100, and after defoaming, the mixture was then hot-pressed at 150° C. for 10 min. to obtain an elastomeric body, which was then post-cured for 4 hours at 200° C.

Comparative Example 1

A comparative liquid-A having a viscosity of 800 poise was prepared from 100 wt. parts of vinyl group-containing diorganopolysiloxane, 5 wt. parts of dry-process fine powder silica, 20 wt. parts of quartz powder and 1 wt. part of red iron oxide. Separately, a comparative liquid-B having a viscosity of 600 poise was prepared from 100 wt. parts of a mixture of vinyl group-containing diorganopolysiloxane and active hydrogen-containing siloxane, 5 wt. parts of dry-process fine powder silica, 20 wt. parts of quartz powder and 1 wt. part of red iron oxide.

The resultant comparative liquids-A and -B were mixed with each other in a weight ratio of 100:100, and after defoaming, the mixture was then hot-pressed at 150° C. for 10 min. to obtain an elastomeric body, which was then post-cured for 4 hours at 200° C.

Comparative Example 2

A comparative liquid-A having a viscosity of 800 poise was prepared from 100 wt. parts of vinyl group-containing diorganopolysiloxane, 5 wt. parts of dry-process fine powder silica, 20 wt. parts of quartz powder and 1 wt. part of red iron oxide. Separately, a comparative liquid-B having a viscosity of 600 poise was prepared from 100 wt. parts of a mixture of vinyl group-containing diorganopolysiloxane and active hydrogen-containing siloxane, 5 wt. parts of dry-process fine powder silica, 20 wt. parts of quartz powder and 1 wt. part of red iron oxide.

1.4 wt. parts of calcium silicate powder impregnated with perfluoroethylene oxide adduct (containing about 1 wt. part of the perfluoroethylene oxide adduct) was added to 100 wt. parts of the above-prepared comparative liquid A, followed by stirring to form a uniform dispersion A-1. Similarly, 4.2 wt. parts of the calcium silicate impregnated with perfluoroethylene oxide adduct was added to 100 wt. parts of the comparative liquid-B, followed by stirring to obtain a uniform dispersion B-1.

The resultant dispersion A-1 and dispersion B-1 were mixed with each other in a weight ratio of 100:100, and after defoaming, the mixture was then hot-pressed at 150° C. for 10 min. to obtain an elastomeric body, which was then post-cured for 4 hours at 200° C.

Some physical properties of the above-mentioned elastic materials obtained in Examples 1 and 2, and Comparative Examples 1 and 2, are shown in the following Table 1.

TABLE 1

| | Ex. 1 | Ex. 2 | Comp. Ex. 1 | Comp. Ex. 2 |
|---|---|---|---|---|
| Hardness *1 (JIS A) | 25 | 27 | 22 | 20 |
| Tensile strength *1 (kgf/cm$^2$) | 12 | 15 | 5 | 5 |
| Elongation (%) | 230 | 210 | 250 | 260 |
| Tearing strength *1 (kgf/cm) | 12 | 15 | 5 | 5 |
| Impact resilience *1 (%) | 78 | 76 | 80 | 72 |

*1: These properties were evaluated according to JIS K 6301.

EXAMPLE 3

Figure 1A:
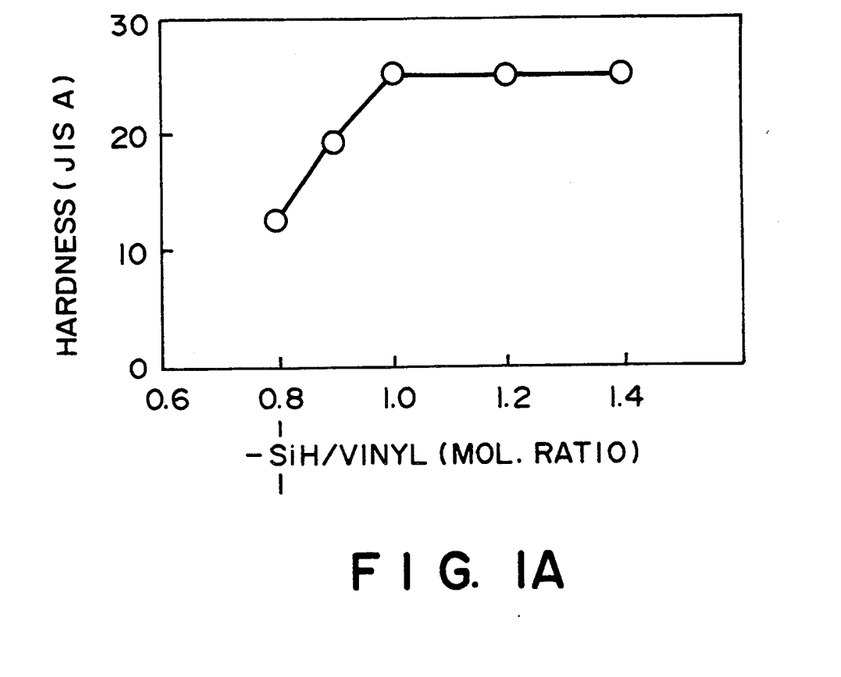
FIGS. 1A-1C are graphs showing relationships between the active hydrogen (—SiH)/vinyl group-molar ratio, and the hardness, impact resilience and toner releasability, respectively, of the cured silicone rubber composition obtained in Example 3 appearing hereinafter.
Figure 1B:
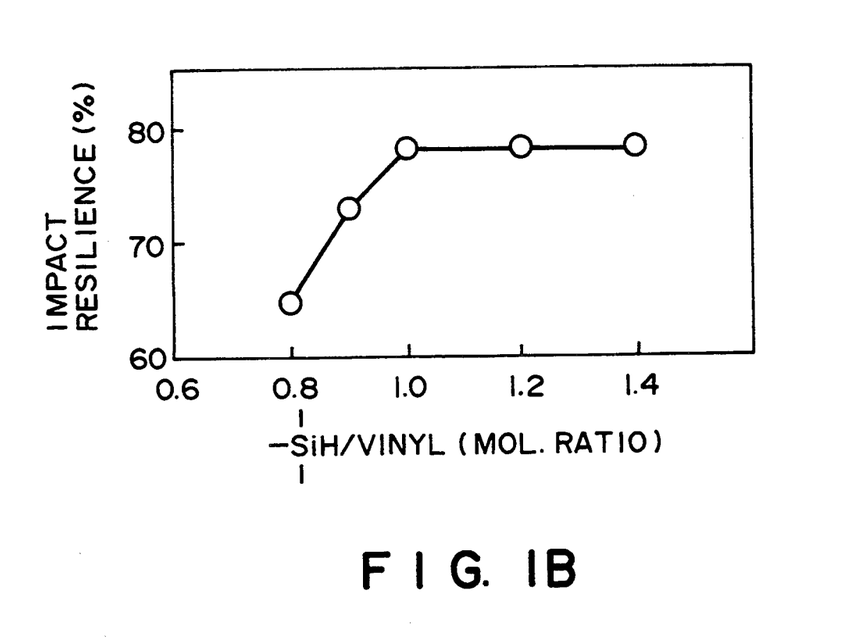
Figure 1C:
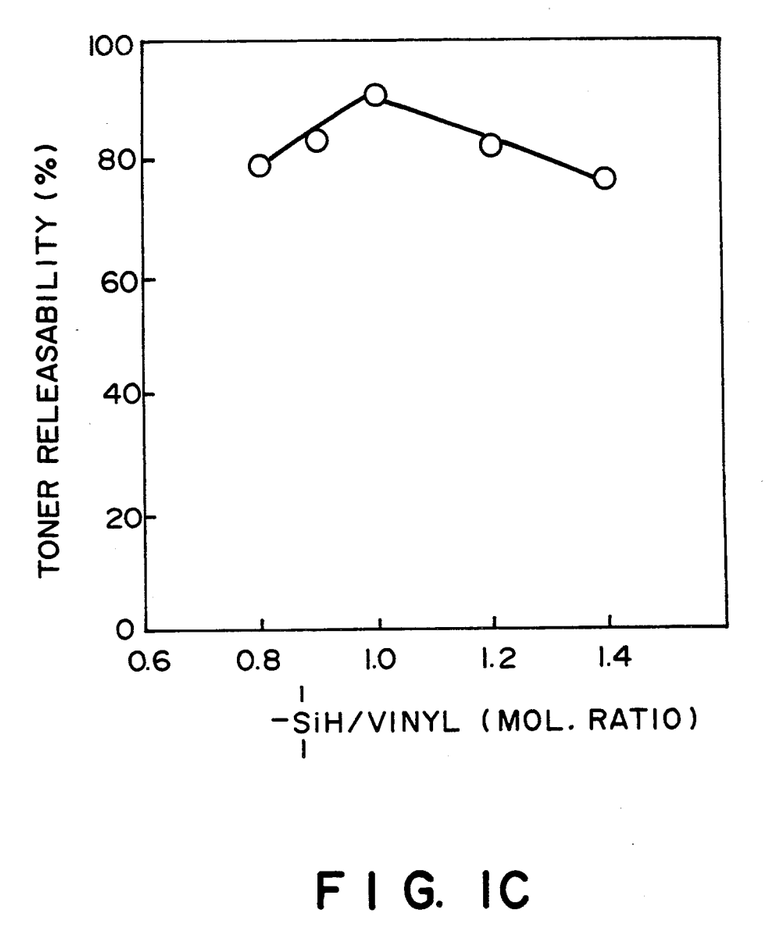

Several compositions were prepared by fixing the amount of the vinyl group-containing hydrous synthetic silicic acid surface-treated with dimethylsilicone oil and vinyl group-containing silane (IV) at 10 wt. parts with respect to 100 wt. parts of the vinyl group-containing dimethylpolysiloxane and changing the amount of the methylhydrogenpolysiloxane, whereby the molar ratio of the Si-bonded hydrogen in the component (II) (methylhydrogenpolysiloxane) to the total of the Si-bonded vinyl groups in the component (I) and the vinyl group in the component (IV) (vinyl group-containing hydrous synthetic silicic acid surface-treated with dimethylsilicone oil and vinyl group-containing silane) was changed. These compositions were respectively heat-cured in a hot press at 150° C. for 10 min. to obtain elastomeric bodies, which were then post-cured for 4 hours at 200° C. These elastomeric bodies were subjected to measurements of hardness, impact resilience and toner releasability (in the manner shown below). The results are shown in FIGS. 1A, 1B and 1C. As shown in these figures, the hardness and the impact resilience reached the maximum and the toner releasability showed the largest value when the molar ratio was 1.

The toner releasability was measured in the following manner.

50 circular toner images having a diameter of 2 mm and a thickness of 50 microns were formed on a sample rubber piece (20 mm×60 mm×15 mm), and the toner images were heat-melted at an environmental temperature of 180° C. for 30 min., and then cooled to room temperature to be solidified. An adhesive tape (Union-A tape mfd. by Union Kogyo K.K.) was attached to the toner images, a rigid roller was reciprocated ten times on the tape, and then the tape was peeled.

The thus obtained peeling conditions of the toner images were classified into five levels, and the numbers of the toner images allotted to the levels were respectively measured and marked. The sum of the thus obtained marks was calculated and divided by the total marks (200) to obtain a percentage for each rubber sample. The toner releasability was represented by the thus obtained percentage.

The peeling conditions of the toner images were classified in the following manner.
- A: A state wherein the toner image was completely released (4 marks)
- B: An intermediate state between the state A and the state C (3 marks)
- C: A state wherein ½ of total area was released (2 marks)
- D: An intermediate state between the state C and the state D (1 mark)
- E: A state wherein the toner image completely remained (0 mark)

The toner releasability was calculated according to the following formula:

Toner releasability (%) = $1/200 \times (4 \times a + 3 \times b + 2 \times C + 1 \times d + 0 \times e) \times 100$, wherein a, b, c, d and e represent the number of samples classified at levels A, B, C, D and E, respectively, and $a+b+c+d+e=50$.

EXAMPLE 4

A pressing roller for a heat-pressure fixing device having an elastic layer composed of a cured addition reaction-type silicone rubber composition according to the present invention was prepared in the following manner.

A stainless steel-core bar with an outer diameter of 10 mm for the pressure roller was coated with a siloxane-type primer and then placed in a cylindrical metal mold. Into the mold pre-heated to 130° C., a uniform mixture of the liquid-A and the liquid-B in a weight ratio of 100:100 in Example 1 which had been defoamed, was injected and held for 10 min. at the temperature to be cured.

The silicone rubber-coated pressure roller was taken out of the metal mold after the curing and found to have an outer diameter of 16 mm and a 3 mm-thick silicone rubber coating layer.

The above-prepared pressure roller was incorporated in a heat-pressure fixing device shown in FIG. 2, and a fixing test was conducted while sheets of paper were continuously passed through the fixing device under the conditions shown below. The fixing roller 1 used at that time was composed of an aluminum core bar with an outer diameter of 20 mm coated with a 15 micron-thick tetrafluoroethylene resin layer. <Fixing conditions>

Controlled temperature of the fixing roller surface = 150° C.

Nip pressure between the fixing roller and pressure roller = 6 kgf

Supplied paper: A4 size transfer paper (plain paper) carrying an unfixed toner image corresponding to a test pattern.

Paper supply speed: 4 sheets/min.

As a result, even after 100,000 sheets of paper were passed through the fixing device, no attachment or contamination with toner was caused on the pressure roller surface nor was caused attachment of toner onto the fixing roller surface. No poor images, contamination or dropout of image were observed at all but good image quality and fixing performance were retained. Particularly, no paper wrinkle was observed. Further, paper stacking or jamming, or paper curl was not caused to show a good conveying characteristic. The roller caused very little shape change, thus showing a good size stability.

EXAMPLE 5

A pressure roller was prepared in the same manner as in Example 4 except that the silicone rubber composition prepared in Example 2 was used. The thus obtained pressure roller showed good release performance and fixing performance.

Comparative Example 3

A pressure roller was prepared in the same manner as in Example 4 except that the composition of Comparative Example 1 comprising the comparative liquid-A and comparative liquid-B was used. The obtained pressure roller was incorporated in the fixing apparatus shown in FIG. 2 are subjected to the fixing test in the same manner as in Example 4. As a result, contamination due to toner attachment on the pressure roller surface was observed after passing 10,000 sheets of paper.

What is claimed is:

1. An elastic revolution body comprising an elastic body comprising at least a surface layer thereof formed from a silicon rubber composition, said silicone rubber composition
comprising an addition reaction-type silicone rubber composition prepared from a mixture of
(A) a dimethylpolysiloxane having a vinyl group, a methylhydrogenpolysiloxane and a platinum-based catalyst,
(B) reactive group-containing modified silicic acid powder of which surface has been modified with (i) a compound selected from the group consisting of (a) an alkylsilane, (b) a hexamethyldisilazane, (c) a dimethylsilicone oil and (d) a mixture thereof, and (ii) an unsaturated group-containing silane compound, followed by drying and
(C) inorganic fine powder impregnated with a surfactant, said inorganic fine powder having a pore diameter of 0.01 to 30 microns, an average particle size of 5 to 70 microns and an oil absorption of 200-800 ml/100 g, wherein said inorganic fine powder is impregnated with an amount of surfactant sufficient to produce said silicone rubber composition containing surfactant in a proportion of 0.1-10 wt % and wherein said surfactant is a fluorine-containing surfactant selected from the group consisting of fluorinated alkyl esters, perfluoroalkylpolyoxyethylene ethanol, perfluoroalkylcarboxylic acid salts, perfluoroalkylammonium salts, perfluoroalkylbetaine, perfluoroalkylamine oxide, perfluoroalkylethylene oxide adducts, perfluoroalkyl phosphates, non-dissociative perfluoroalkyl compounds and perfluoro-ethylene oxide adducts or a silicone-containing surfactant selected from the group consisting of polyether-modified silicone oil, epoxypolyether-modified silicone oil, alkylaralkylpolyether-modified silicone oil and amino-modified silicone oil.

2. A revolution body according to claim 1, wherein said silicone rubber composition comprises a dimethylpolysiloxane having a vinyl group, methylhydrogenpolysiloxane, a platinum-based catalyst, reactive group-containing modified silicic acid powder and inorganic fine powder impregnated with a surfactant and is heat-cured to provide at least the surface layer of the elastic body.

3. A revolution body according to claim 2, wherein
said reactive group-containing modified silicic acid powder has been obtained by treating synthetic silicic acid powder with (i) a compound selected from the group consisting of (a) an alkylsilane, (b) hexamethyldisilazane and (c) a dimethylsilicone and (ii) a vinyl group-containing silane compound, and
said inorganic fine powder impregnated with a surfactant comprises inorganic fine powder impregnated with a fluorine-containing surfactant.

4. A revolution body according to claim 2, wherein said synthetic silicic acid has a particle size of 7-100 mμ and a BET specific surface area of 40-500 m²/g.

5. A revolution body according to claim 2, wherein said reactive group-containing modified silicic acid powder is contained in a proportion of 0.5-20 wt. parts per 100 wt. parts of the addition reaction-type silicone rubber.

6. A revolution body according to claim 2, wherein said reactive group-containing modified silicic acid powder is contained in a proportion of 1-15 wt. parts per 100 wt. parts of the addition reaction-type silicone rubber.

7. A revolution body according to claim 2, wherein said inorganic fine powder impregnated with 100-600 parts by weight of the surfactant per 100 parts by weight of the inorganic fine powder.

8. A revolution body according to claim 2, wherein said inorganic fine powder impregnated with 400-500 parts by weight of the surfactant per 100 parts by weight of the inorganic fine powder.

9. A revolution body according to claim 3, wherein said fluorine-containing surfactant is contained in a proportion of 0.1-10 wt. % with respect to the addition reaction-type silicone rubber.

10. A revolution body according to claim 3, wherein said fluorine-containing surfactant is contained in a proportion of 0.5-5 wt. % with respect to the addition reaction-type silicone rubber.

11. A revolution body according to claim 2, wherein said dimethylpolysiloxane having a vinyl group is represented by at least one of the following two formulas wherein l is a positive integer, or wherein m and n respectively denote a positive integer and k denotes 0 or a positive integer.

12. A revolution body according to claim 11, wherein l denotes an integer of 50-2000 or m+k makes an integer of 50-2000 and n denotes an integer of 1-10.

13. A revolution body according to claim 2, wherein said methylhydrogenpolysiloxane is represented by the formula:

wherein p and q respectively denote a positive integer and r denotes 0 or a positive integer.

14. A revolution body according to claim 13, wherein p+r makes an integer of 50-500, and q is an integer of 1-10.

15. A fixing device comprising a pair of rollers for passing therebetween a toner-supporting material carrying an unfixed toner image to fix the toner image onto the toner image-supporting material, wherein at least one of said pair of rollers comprises an elastic surface layer formed from a silicone rubber composition wherein, the silicone rubber composition comprises an addition reaction-type silicon rubber composition prepared from a mixture of
(A) a dimethylpolysiloxane having a vinyl group, a methylhydrogenpolysiloxane and a platinum-based catalyst,
(B) reactive group-containing modified silicic acid powder of which surface has been modified with (i)

a compound selected from the group consisting of (a) an alkylsilane, (b) a hexamethyldisilazane, (c) a dimethylsilicone oil and (d) a mixture thereof, and (ii) an unsaturated group-containing silane compound, followed by drying and (C) inorganic fine powder impregnated with a surfactant, said inorganic fine powder having a pore diameter of 0.01 to 30 microns, an average particle size of 5 to 70 microns and an oil absorption of 200–800 ml/100 g, wherein said inorganic fine powder is impregnated with an amount of surfactant sufficient to produce said silicone rubber composition containing surfactant in a proportion of 0.1–10 wt % and wherein said surfactant is a fluorine-containing surfactant selected from the group consisting of fluorinated alkyl esters, perfluoroalkylpolyoxyethylene ethanol, perfluoroalkylcarboxylic acid salts, perfluoroalkylammonium salts, perfluoroalkylbetaine, perfluoroalkylamine oxide, perfluoroalkylethylene oxide adducts, perfluoroalkyl phosphates, non-dissociative perfluoroalkyl compounds and perfluoro-ethylene oxide adducts or a silicone-containing surfactant selected from the group consisting of polyether-modified silicone oil, epoxypolyether-modified silicone oil, alkylaralkylpolyether-modified silicone oil and amino-modified silicone oil.

16. A fixing device according to claim 15, wherein said silicone rubber composition comprises a dimethylpolysiloxane having a vinyl group, methylhydrogenpolysiloxane, a platinum-based catalyst, reactive group-containing modified silicic acid powder and inorganic fine powder impregnated with a surfactant and is heat-cured to provide the elastic surface layer.

17. A fixing device according to claim 16, wherein said reactive group-containing modified silicic acid powder has been obtained by treating synthetic silicic acid powder with (i) a compound selected from the group consisting of (a) an alkylsilane, (b) hexamethyldisilazane and (c) a dimethylsilicone, and (ii) a vinyl group-containing silane compound, and said inorganic fine powder impregnated with a surfactant comprises inorganic fine powder impregnated with a fluorine-containing surfactant.

18. A fixing device according to claim 16, wherein said synthetic silicic acid has a particle size of 7–100 mµ and a BET specific surface area of 40–500 m²/g.

19. A fixing device according to claim 16, wherein said reactive group-containing modified silicic acid powder is contained in a proportion of 0.5–20 wt. parts per 100 wt. parts of the addition reaction-type silicone rubber.

20. A fixing device according to claim 16, wherein said reactive group-containing modified silicic acid powder is contained in a proportion of 1–15 wt. parts per 100 wt. parts of the addition reaction-type silicone rubber.

21. A fixing device according to claim 16, wherein said inorganic fine powder impregnated with 100–600 parts by weight of the surfactant per 100 parts by weight of the inorganic fine powder.

22. A fixing device according to claim 16, wherein said inorganic fine powder impregnated with 400–500 parts by weight of the surfactant per 100 parts by weight of the inorganic fine powder.

23. A fixing device according to claim 17, wherein said fluorine-containing surfactant is contained in a proportion of 0.1–10 wt. % with respect to the addition reaction-type silicone rubber.

24. A fixing device according to claim 17, wherein said fluorine-containing surfactant is contained in a proportion of 0.5–5 wt. % with respect to the addition reaction-type silicone rubber.

25. A fixing device according to claim 16, wherein said dimethylpolysiloxane having a vinyl group is represented by at least one of the following two formulas wherein l is a positive integer, or wherein m and n respectively denote a positive integer and k denotes 0 or a positive integer.

26. A fixing device according to claim 25, wherein l denotes an integer of 50–2000 or m+k makes an integer of 50–2000 and n denotes an integer of 1–10.

27. A fixing device according to claim 16, wherein said methylhydrogenpolysiloxane is represented by the formula:

wherein p and q respectively denote a positive integer and r denotes 0 or a positive integer.

28. A fixing device according to claim 27, wherein p+r makes an integer of 50–500, and q is an integer of 1–10.

29. A fixing device according to claim 15, wherein said pair of rollers comprises a pressing roller and a heating roller.

30. A fixing device according to claim 29, wherein said pressing roller is provided with a conducting means for grounding.

31. A fixing device according to claim 29, wherein said heating roller is equipped with a heater disposed inside thereof.

* * * * *

UNITED STATES PATENT AND TRADEMARK OFFICE
CERTIFICATE OF CORRECTION

PATENT NO. : 5,364,697
DATED : November 15, 1994
INVENTOR(S) : TOSHIYUKI MIYABAYASHI It is certified that error appears in the above-identified patent and that said Letters Patent is hereby corrected as shown below:

COLUMN 3

Line 18, "a" should be deleted.

COLUMN 4

Line 23, "thereof" should read --thereof with--.

COLUMN 9

Line 33, "with-" should read --with--.

COLUMN 11

Line 44, "The-liquid-A" should read --The liquid-A--.

COLUMN 14

Line 27, "layer. <Fixing" should read --layer. ¶ <Fixing--.
Line 62, "are" should read --and--.

UNITED STATES PATENT AND TRADEMARK OFFICE
CERTIFICATE OF CORRECTION

PATENT NO. : 5,364,697
DATED : November 15, 1994
INVENTOR(S) : TOSHIYUKI MIYABAYASHI It is certified that error appears in the above-identified patent and that said Letters Patent is hereby corrected as shown below:

COLUMN 15

Line 1, "silicon" should read --silicone--.

Signed and Sealed this

Fourth Day of April, 1995

Attest:

BRUCE LEHMAN

Attesting Officer

Commissioner of Patents and Trademarks